United States Patent
Kenan et al.

(10) Patent No.: US 9,133,014 B2
(45) Date of Patent: Sep. 15, 2015

(54) PORTABLE LIQUID TRANSLOADER

(71) Applicant: ALUMINUM LADDER COMPANY, Florence, SC (US)

(72) Inventors: Michael Kenan, Florence, SC (US); Anthony J. Cook, Florence, SC (US); Douglas S. Parris, Florence, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 265 days.

(21) Appl. No.: 13/905,614

(22) Filed: May 30, 2013

(65) Prior Publication Data

US 2014/0352830 A1 Dec. 4, 2014

(51) Int. Cl.
*B67D 7/84* (2010.01)
*B67D 7/40* (2010.01)
*B67D 7/76* (2010.01)
(Continued)

(52) U.S. Cl.
CPC *B67D 7/40* (2013.01); *B67D 7/763* (2013.01); *B67D 7/845* (2013.01); *B60P 3/22* (2013.01); *B67D 7/04* (2013.01); *B67D 7/0476* (2013.01); *B67D 7/16* (2013.01); *B67D 7/22* (2013.01); *B67D 7/38* (2013.01); *B67D 7/62* (2013.01); *B67D 7/76* (2013.01); *B67D 7/84* (2013.01); *Y10T 137/6855* (2015.04); *Y10T 137/86035* (2015.04); *Y10T 137/8807* (2015.04)

(58) Field of Classification Search
CPC .......... B67D 7/40; B67D 7/763; B67D 7/845; B67D 7/0476; B67D 7/16; B67D 7/22; B67D 7/62; B67D 7/04; B67D 7/38; B67D 7/84; B67D 7/76; B60P 3/22; Y10T 137/86035; Y10T 137/8807; Y10T 137/6855

USPC ............ 222/608, 612, 189.06; 137/899, 551, 137/171, 127; 141/59, 65; 182/115, 63.1, 182/129

See application file for complete search history.

(56) References Cited

U.S. PATENT DOCUMENTS

| | | | |
|---|---|---|---|
| 317,899 A | * | 5/1885 | Ward .............................. 182/51 |
| 2,777,606 A | * | 1/1957 | Moore et al. .................... 222/26 |

(Continued)

OTHER PUBLICATIONS

Total Control Systems 7888 Ticket Printer www.tcsmeters.com/index.php/en/products/details/25/11/mechanical-registration/7888-ticket-printer, May 24, 2013.

(Continued)

*Primary Examiner* — Craig Schneider
*Assistant Examiner* — Josephine Trinidad-Borges
(74) *Attorney, Agent, or Firm* — Dority & Manning, P.A.

(57) ABSTRACT

A portable liquid transloader includes a wheeled support vehicle. The wheeled support vehicle includes a chassis and a manually operated extension ladder. The extension ladder includes a base section that is carried by the chassis and a fly section that is extendably connected to the base section. A platform extends horizontally outwardly from the fly section. The portable liquid transloader further includes a bulk air eliminator that is carried by the chassis. An inlet is disposed upstream from the bulk air eliminator. A mechanical flow meter is disposed downstream from the bulk air eliminator. A first supply conduit extends downstream from the mechanical flow meter. The first supply conduit is carried by the chassis and extends generally parallel to the extension ladder. A second supply conduit is fluidly coupled to the first supply conduit. The second supply conduit extends vertically above and horizontally beyond the platform.

17 Claims, 6 Drawing Sheets

(51) Int. Cl.
- B67D 7/04 (2010.01)
- B67D 7/16 (2010.01)
- B67D 7/22 (2010.01)
- B67D 7/62 (2010.01)
- B67D 7/38 (2010.01)
- B60P 3/22 (2006.01)

(56) References Cited

U.S. PATENT DOCUMENTS

| | | | |
|---|---|---|---|
| 2,944,625 A | | 7/1960 | Shore et al. |
| 2,948,306 A | * | 8/1960 | Kuraeff ............... 141/231 |
| 3,266,675 A | * | 8/1966 | Willis ................. 222/160 |
| 4,422,485 A | * | 12/1983 | O'Shea et al. ........... 141/98 |
| 4,530,419 A | | 7/1985 | Rumage et al. |
| 4,679,657 A | | 7/1987 | Bennett et al. |
| 5,042,612 A | | 8/1991 | Bennett et al. |
| 5,299,653 A | | 4/1994 | Nebel |
| 5,967,258 A | | 10/1999 | Scott et al. |
| 6,085,867 A | | 7/2000 | Daniel, III et al. |
| 6,390,152 B1 | | 5/2002 | Donovan et al. |
| 6,405,831 B1 | | 6/2002 | Daniel, III |
| 6,502,267 B2 | | 1/2003 | MacDonald et al. |
| 6,502,709 B1 | | 1/2003 | Parker |
| 6,527,081 B1 | | 3/2003 | Tyner et al. |
| 6,722,489 B1 | | 4/2004 | Cook |
| 6,772,860 B1 | | 8/2004 | Nelson |
| 6,814,522 B1 | | 11/2004 | Daniel, III |
| 6,923,140 B1 | | 8/2005 | Cook |
| 7,140,467 B2 | | 11/2006 | Cook |
| 7,216,741 B2 | | 5/2007 | MacDonald et al. |
| 7,448,470 B2 | | 11/2008 | Brown et al. |
| 7,798,344 B2 | | 9/2010 | Bennett et al. |
| 7,802,652 B2 | | 9/2010 | Bennett et al. |
| 7,828,116 B2 | * | 11/2010 | Vetesnik ............... 182/18 |
| 7,832,525 B2 | | 11/2010 | Bennett et al. |
| 8,015,647 B2 | | 9/2011 | Bennett |
| 8,051,951 B2 | | 11/2011 | Bennett et al. |
| 8,403,109 B2 | | 3/2013 | Bennett |
| 2002/0174496 A1 | | 11/2002 | MacDonald et al. |
| 2005/0241878 A1 | | 11/2005 | Cook |
| 2006/0054392 A1 | | 3/2006 | MacDonald et al. |
| 2007/0125600 A1 | | 6/2007 | Bennett et al. |
| 2007/0209873 A1 | | 9/2007 | Bennett et al. |
| 2009/0256380 A1 | | 10/2009 | Bennett et al. |
| 2010/0307868 A1 | | 12/2010 | Bennett et al. |
| 2011/0078864 A1 | | 4/2011 | Bennett |
| 2011/0127111 A1 | | 6/2011 | Bennett |

OTHER PUBLICATIONS

Total Control Systems 7889 Preset Counter www.tcsmeters.com/index.php[/en/products/details/26/11/mechanical-registration/7889-preset-counter, May 24, 2013.

Total Control Systems 700 Rotary Flow Meter www.tcsmeters.com/index.pho/en/products/details/36/1/flow-m eters/700-rotary-flow-meter, May 24, 2013.

Total Control Systems 7887 Register www.tcsmeters.com/index.php/en/products/details/24/11/mechanical-registration/7887-register, May 24, 2013.

* cited by examiner

PORTABLE LIQUID TRANSLOADER

FIELD OF THE INVENTION

The present invention generally involves a transloader for transferring a liquid between a supply tank and a receiver tank. More specifically, the invention relates to an all mechanical portable liquid transloader for transferring a liquid between a supply tank and a receiver tank.

BACKGROUND OF THE INVENTION

Induced hydraulic fracturing or "fracking" is one method for recovering petroleum or other hydrocarbons from subterranean rock formations. Petroleum wells that utilize the fracking process may include a tank or "day tank" for temporarily storing the recovered petroleum. Once the tank reaches its maximum capacity, it is transported to a staging site, usually by tractor trailer, where the contents of the tank are transferred to a tanker rail car. In the alternative, the petroleum from the tank may be emptied into a tanker truck and transported to the staging site where the contents are transferred from the tanker truck to the rail car. The process of transferring the contents of the tank and/or the tanker truck to the rail car is commonly referred to as transloading.

Typically, the staging sites are located along remote rail spurs where the rail tanker cars are parked until filled and/or until a pre-scheduled pick up date. In many instances, the rail spurs are located along isolated sections of the rail road tracks and are only intended for temporary use until the supply of locally sourced petroleum is exhausted. Thus, many of the staging sites lack infrastructure (such as pipelines, electric power, pumping stations, etc.) adequate for supporting the transloading process. As a result, portable transloaders are required at these isolated staging sites.

Existing portable transloading devices generally require electrical power to drive pumps that transfer the petroleum from the tank to the rail car and to operate the metering devices to measure the volume of the petroleum transferred. However, many of the staging sites lack a source of electrical power to drive the pumps and metering devices that are required for transloading and measuring the transloaded petroleum.

In addition, some of the portable transloading devices include electrically or hydraulically controlled ladders and/or platforms that allow for access to the top portion of the rail car. Typically, the electrical power for such devices is provided by a portable power source such as a generator. However, portable electric generators require fuel to operate their engines, which are subject to mechanical failure at these remote sites. Getting fuel to these remote sites is problematical, as is storage of such fuel at such sites. In most cases, the electric generator is located onboard the portable transloading device, thereby adding weight and impacting maneuverability of the portable transloading device by the operator within the often times tight confines of the transloading site. As a result, transloading operations using existing portable transloading devices in these isolated areas are limited.

BRIEF DESCRIPTION OF THE INVENTION

Aspects and advantages of the invention are set forth below in the following description, or may be obvious from the description, or may be learned through practice of the invention.

One embodiment of the present invention is a portable liquid transloader that operates without electrical power. The portable liquid transloader includes a wheeled support vehicle. The wheeled support vehicle includes a chassis and a manually operated extension ladder. The extension ladder includes a base section that is carried by the chassis and a fly section that is extendably connected to the base section. A platform extends horizontally outwardly from the fly section. The portable liquid transloader further includes a bulk air eliminator that is carried by the chassis. An inlet is disposed upstream from the bulk air eliminator. A mechanical flow meter is disposed downstream from the bulk air eliminator. A first supply conduit extends downstream from the mechanical flow meter. The first supply conduit is carried by the chassis and extends generally parallel to the extension ladder. A second supply conduit is fluidly coupled to the first supply conduit. The second supply conduit extends vertically above and horizontally beyond the platform. The pump employed by the tanker truck to offload the petroleum product suffices for operation of the mechanical flow meter.

Another embodiment of the present invention is a portable liquid transloader that operates without electrical power. The portable liquid transloader includes a wheeled support vehicle having a chassis. The chassis includes a forward portion and an aft portion. The aft portion is disposed at an opposite end of the chassis from the forward portion. The portable liquid transloader further includes a manually operated extension ladder that includes a base section. The base section is connected to the chassis proximate to the forward portion. The extension ladder includes a fly section that is extendable from the base section. A platform extends horizontally outward from the fly section. A bulk air eliminator is carried by the chassis. An inlet is disposed upstream from the bulk air eliminator. A mechanical flow meter is disposed downstream from the bulk air eliminator. A first supply conduit extends downstream from the mechanical flow meter. The first supply conduit is carried by the chassis. A second supply conduit is fluidly coupled to the first supply conduit. The second fluid conduit extends beyond the platform. The bulk air eliminator and the mechanical flow meter are carried by the chassis proximate to the aft portion and provide substantial counterbalance for the extension ladder and platform.

Another embodiment of the present invention is a portable liquid transloader that operates without electrical power. The portable liquid transloader includes a wheeled support vehicle having a chassis and a manually operated extension ladder having a base section that is carried by the chassis. The extension ladder includes a fly section selectively extendable from the base section. A platform extends horizontally outwardly from the fly section and can carry a fall protection enclosure that extends from the distal end of the platform. A bulk air eliminator is carried by the chassis. An inlet is disposed upstream from the bulk air eliminator. A mechanical flow meter is disposed downstream from the bulk air eliminator. The mechanical flow meter includes at least one of the components selected from the following: a mechanical preset counter, a mechanical register and a mechanical printer. A first supply conduit extends downstream from the mechanical flow meter. The first supply conduit is carried by the chassis and extends generally parallel to the extension ladder. A second supply conduit is fluidly coupled to the first supply conduit. The second supply conduit extends horizontally beyond the platform. The first supply conduit is connected to the second supply conduit via a fluid coupling that swivels about an axis to prevent kinking of said second supply conduit. The pump employed by the tanker truck to offload the petroleum product suffices for operation of the mechanical flow meter. The bulk air eliminator and the mechanical flow meter are carried by the chassis proximate to the aft portion and provide substantial counterbalance for the extension ladder, the first and second supply conduits, the platform and any fall protection enclosure.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. And the terms upstream and downstream also implicate the fact that the elements having this relative relationship are connected in fluid communication with each other.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
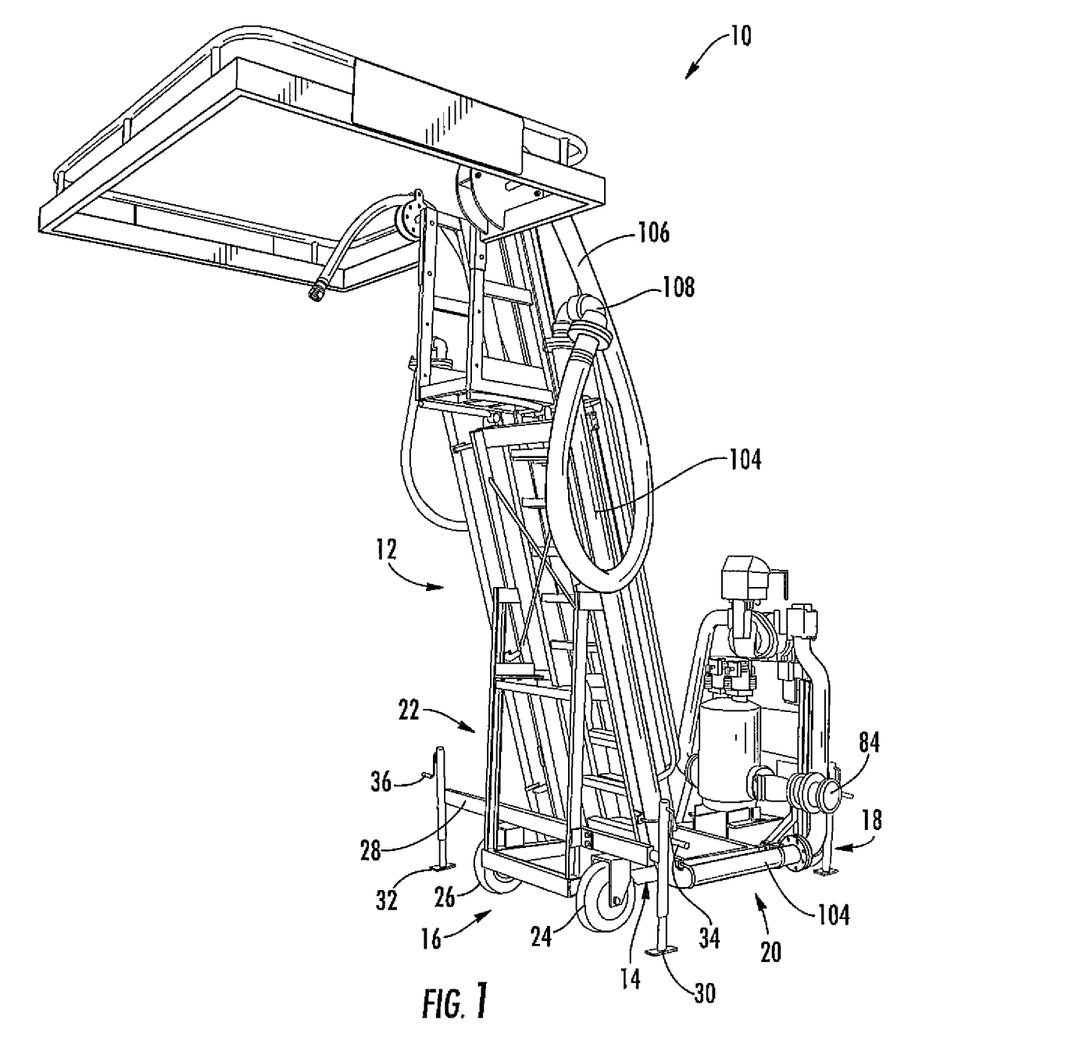
FIG. 1 provides a port side perspective view of a portable liquid transloader in a fully retracted configuration, according to various embodiments of the present invention.

Referring now to the drawings, wherein identical numerals indicate the same elements throughout the figures, FIG. 1 provides a port side perspective view of a portable liquid transloader 10 including a manually operated extension ladder in a fully retracted (i.e. unextended) configuration according to various embodiments of the present invention. As shown in FIG. 1, the portable liquid transloader 10, herein referred to as "transloader 10", includes a wheeled support vehicle 12 having a chassis 14. The chassis 14 includes a forward portion 16 that is horizontally separated from an aft portion 18. The chassis 14 also includes a port side 20 that is laterally separated from a starboard side 22. The forward portion 16 of the chassis 14 is supported by a pair of laterally spaced support wheels 24, 26.

An outrigger 28 extends laterally outwardly from the chassis 14 proximate to the forward portion 16. The outrigger 28 may be connected to the chassis 14 via U-bolts, brackets or the like. At least two vertically adjustable feet 30, 32 are laterally spaced along the outrigger 28 to level and stabilize the chassis 14 during operation of the transloader 10. Each of the vertically adjustable feet 30, 32 desirably is manually operated by a hand crank 34, 36.

Figure 2:
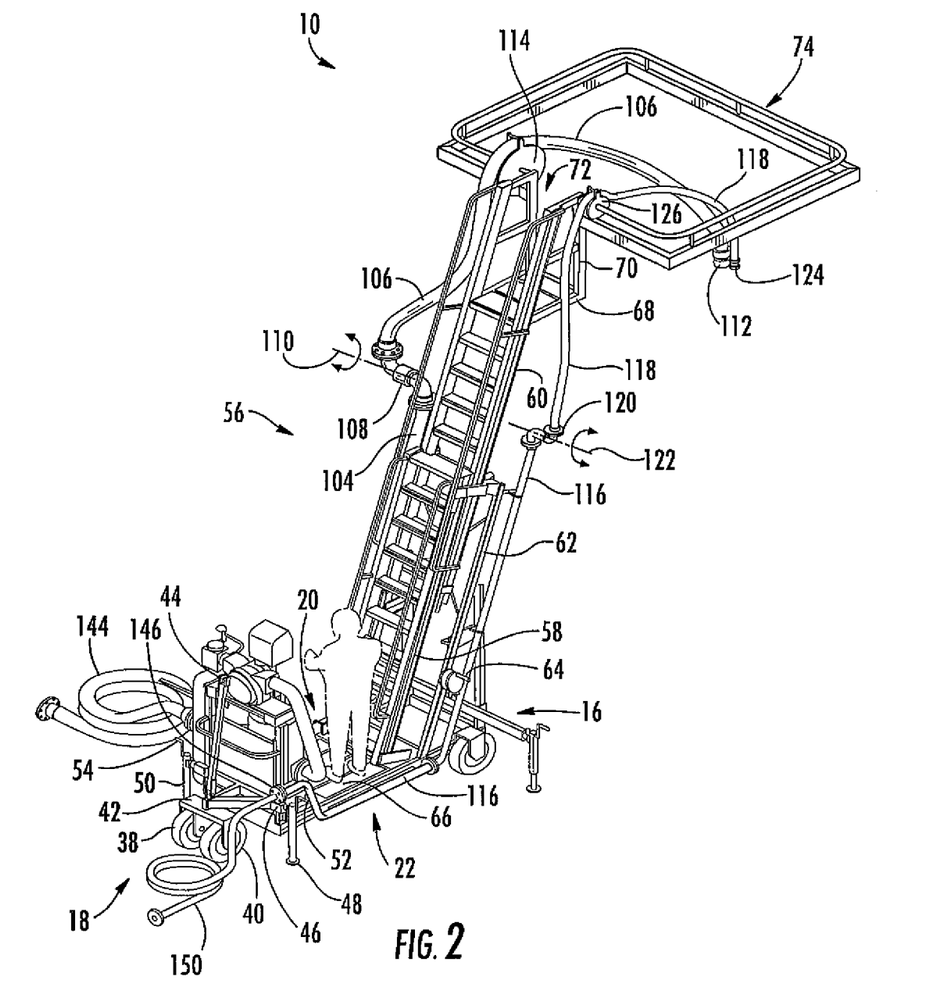
FIG. 2 provides a starboard side perspective view of the portable liquid transloader as shown in FIG. 1 in an extended configuration, according to various embodiments of the present invention.

FIG. 2 provides a starboard side perspective view of the transloader 10 as shown in FIG. 1, with a manually operated extension ladder in an extended configuration, according to various embodiments of the present invention. As shown in FIG. 2, a pair of side-by-side support wheels 38, 40 is mounted on a steering fork 42 proximate to the aft portion 18 of the chassis 14. The steering fork 42 is pivotally connected to an aft and/or horizontally projecting part of the chassis 14. A tow bar 44 is coupled to the steering fork 42.

In particular configurations, an outrigger 46 extends laterally outwardly from the chassis 14 proximate to the aft portion 18. The outrigger 46 is connected to the chassis 14. At least two vertically adjustable feet 48, 50 are laterally spaced along the outrigger 46 to level and stabilize the chassis 14 during operation of the transloader 10. Each of the vertically adjustable feet 48, 50 is manually operated by a hand crank 52, 54.

As shown in FIGS. 1 and 2 for example, the chassis 14, and thus the transloader 10, is carried by the rotatable wheels 24, 26 at the forward portion 16 and the rotatable wheels 38, 40 at the aft portion 18. The wheels 24, 26, 38, 40 render the transloader 10 mobile through the manual effort of one or more operators pushing the transloader 10 between desired locations out in the field of operation.

In particular embodiments, as shown in FIG. 2 for example, the transloader 10 desirably includes a manually operated extension ladder 56, herein referred to as "extension ladder 56", that extends generally vertically upwardly from the chassis 14. The extension ladder 56 includes a base section 58 that has a plurality of vertically spaced apart steps. Each step extends horizontally between a pair of spaced apart vertically extending side rails. The base section 58 is connected to and/or carried by the chassis 14, and an extendable fly section 60, herein referred to as "fly section 60", is slideably engaged with and/or extendably connected to the base section 58. The base section 58 may be connected to and/or carried by the chassis 14 via one or more braces or brackets 62, A manually operated winch 64 is provided to manually adjust the elevation or height of the fly section 60.

A plate 66 is carried by and extends horizontally and laterally across at least a portion of the chassis 14. The plate 66 extends from the aft portion 18 towards the base section 58 of the extension ladder 56 and at least partially between the port and starboard sides 20, 22. The plate 66 provides a surface for an operator to stand during operation of the transloader 10 and provides for access to the extension ladder 56.

As shown in FIG. 2, a platform 68 extends horizontally outwardly from the fly section 60 directly above the uppermost step thereof. In one embodiment, the platform 68 is connected to and/or supported by the fly section 60. As a result, the manually operated winch 64 adjusts the elevation of the platform 68. At each of the port and starboard sides 20, 22 at a distal end of the platform, there is at least one support member 70 that extends upwards from the distal end of the platform 68 in a generally vertical direction to at least partially define an egress opening 72 from the platform 68. A guard rail 74 extends laterally and horizontally outward from each support member 70. The fly section 60 provides access to the egress opening 72, to the platform 68, and thus the guard rail 74.

Figure 3:
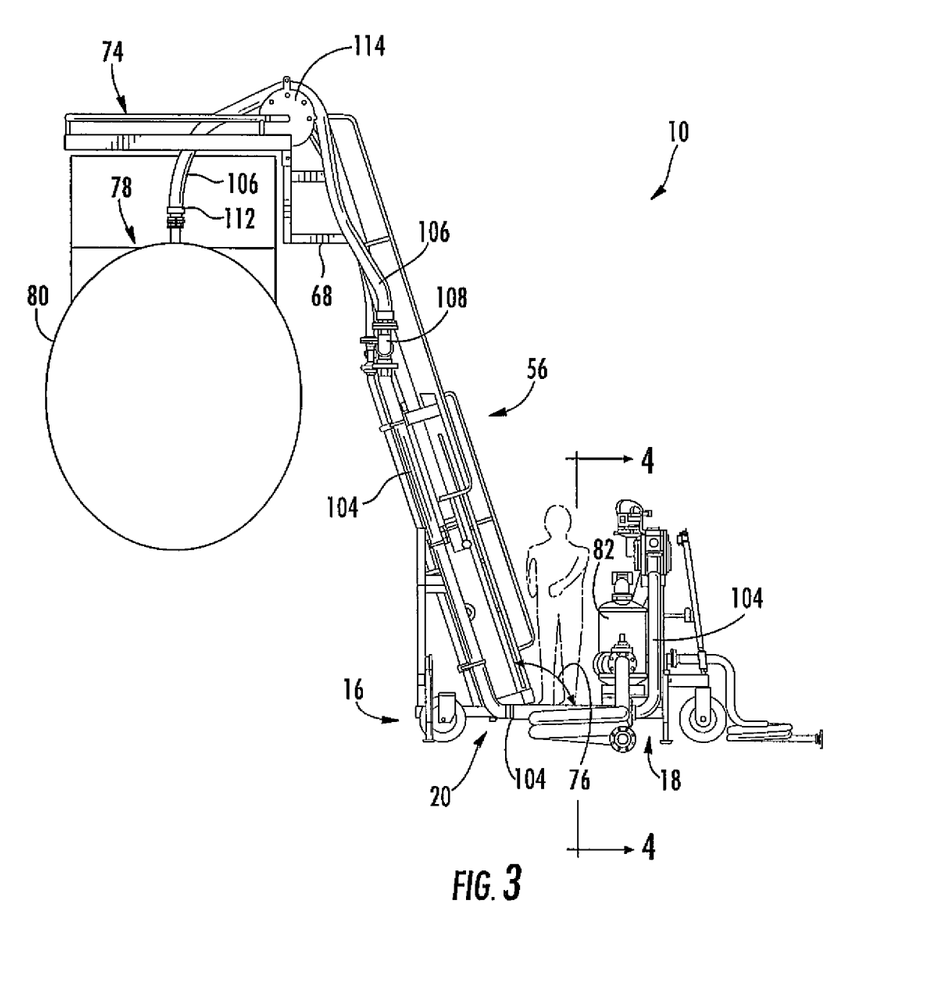
FIG. 3 provides a port side view of the portable liquid transloader as shown in FIG. 2, according to various embodiments of the present invention.

FIG. 3 provides a port side view of the transloader 10 as shown in FIG. 2, according to various embodiments of the present invention. As shown in FIG. 3, the extension ladder 56 extends upwardly at an angle 76 with respect to the chassis 14 such that the platform 68 extends horizontally beyond the front portion 16 of the chassis 14 a sufficient distance to permit the platform 68 to be placed proximate to a top portion 78 of a container or tank 80 such that the guard rail 74 extends across at least a portion of the top portion 78 of the tank 80, thereby allowing an operator to safely cross from the platform 68 onto the container or tank 80.

Figure 4:
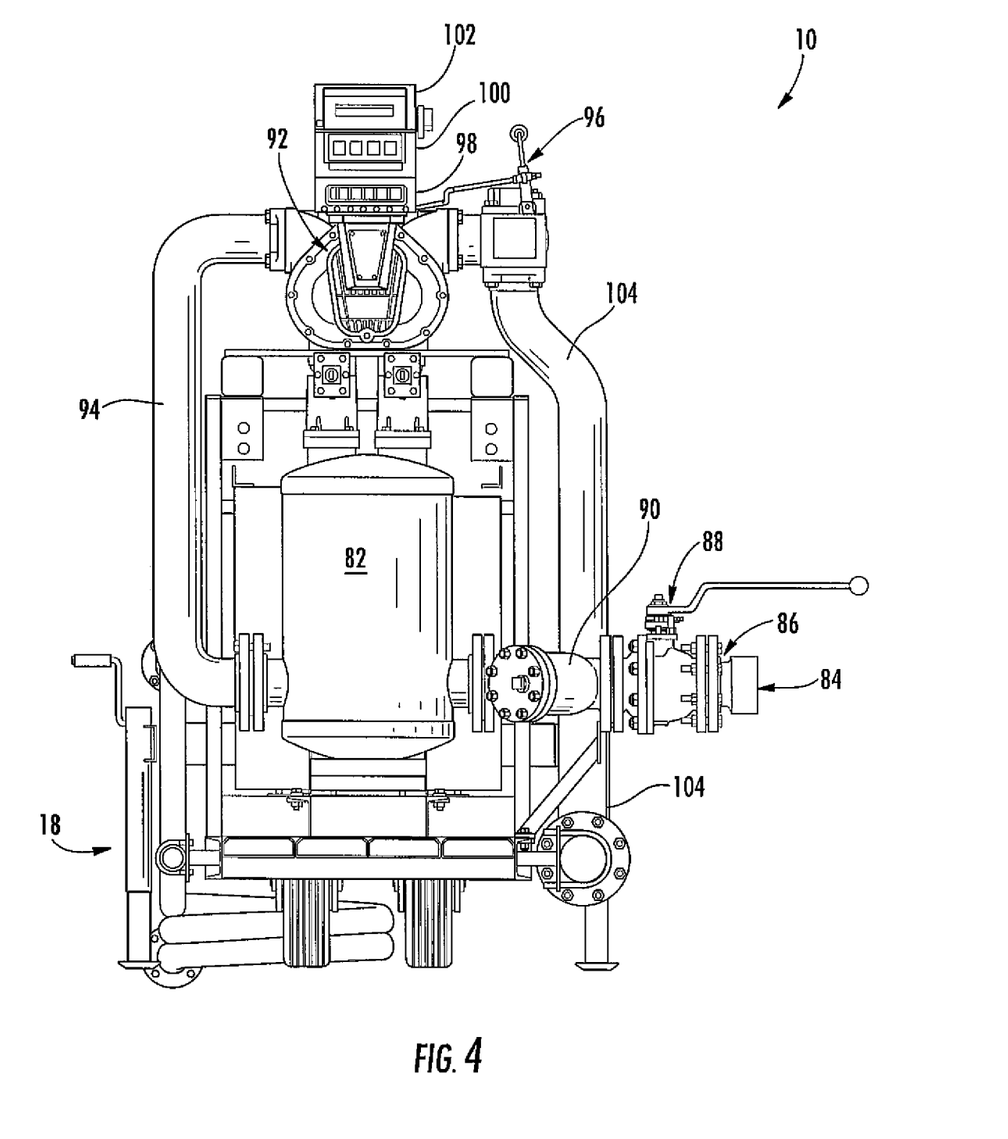
FIG. 4 provides a cross section front view of a portion of the portable liquid transloader as viewed along site-line 4-4 as shown in FIG. 3, according to various embodiments of the present invention.
Figure 5:
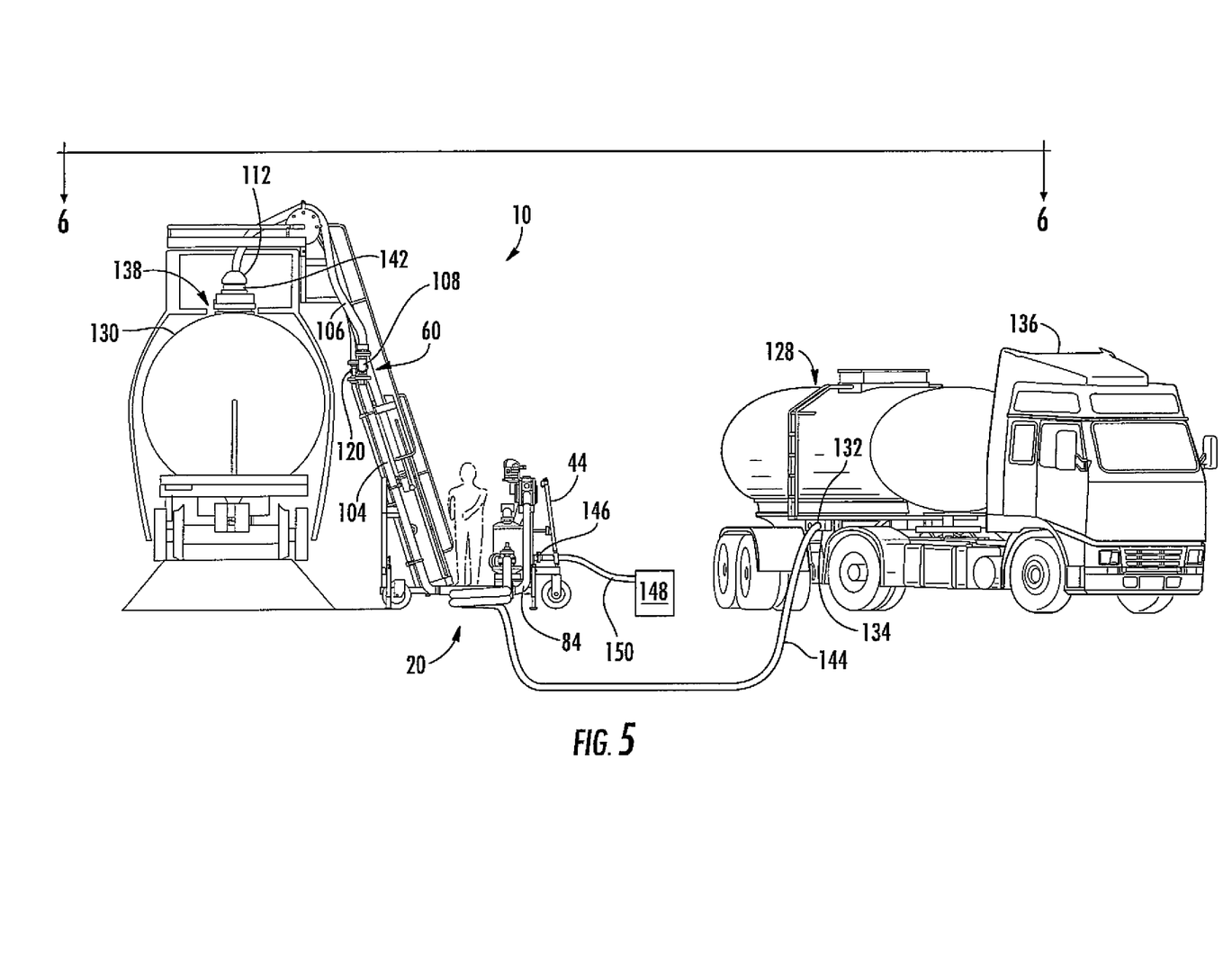
FIG. 5 provides a port side view of the portable liquid transloader in operation according to various embodiments of the present invention.

FIG. 4 provides a cross sectional front view of a portion of the transloader 10 as viewed along site-line 4-4 as shown in FIG. 3, according to various embodiments of the present invention. As shown in FIGS. 3 and 4, a bulk air eliminator 82 is mounted, connected to and/or carried by the chassis 14. In one embodiment, as shown in FIG. 3, the bulk air eliminator 82 is mounted or connected to the chassis 14 generally proximate to the all portion 18. As shown in FIGS. 4 and 5, an inlet 84 is disposed upstream from the bulk air eliminator 82. As shown in FIG. 4, the inlet 84 may be at least partially defined by a fluid fitting and/or a flange 86. One or more fluid conduits and/or couplings may extend between the inlet 84 and the bulk air eliminator 82 to provide for fluid communication therebetween.

As shown in FIG. 4, a manual shut off valve 88 such as a butterfly or ball type valve may be disposed downstream from the inlet 84 and upstream from the bulk air eliminator 82. A fluid filter 90 such as a Wye type strainer may be disposed downstream from the inlet 84 and/or the manual shut off valve 88. In one embodiment, the fluid filter 90 is disposed downstream from the inlet 84 and upstream from the bulk air eliminator 82.

In particular embodiments, a mechanical flow meter 92 is disposed downstream from the bulk air eliminator 82. One or more fluid conduits and/or couplings 94 extend between the bulk air eliminator 82 and the mechanical flow meter 92 to provide for fluid communication therebetween. As shown in FIG. 4 for example, a manual flow control valve 96 may be disposed downstream from the mechanical flow meter 92 to control a flow of a liquid such as petroleum that flows from the inlet 84, through the bulk air eliminator 82 and through the mechanical flow meter 92.

In particular embodiments as shown in FIG. 4 for example, the mechanical flow meter 92 may include at least one of a mechanical preset counter 98, a mechanical register 100 and/or a mechanical ticket printer 102. The mechanical register 100 may display a total volume of a fluid that flows through the mechanical flow meter 92. The mechanical register 100 may include a non-resettable display and/or a resettable display. The mechanical ticket printer 102 may be coupled to the mechanical register 100 and/or to the mechanical preset counter 98. The mechanical ticket printer 102 may be configured to provide an operator with a mechanically printed and/or punched receipt based on a volume of a fluid flowing through the mechanical flow meter 92. Each of the mechanical flow meter 92, the mechanical preset counter 98, the mechanical register 100 and the mechanical ticket printer 102 is mechanically operated and thus does not require electrical power for operation.

As shown in FIG. 4 for example, a first supply conduit 104 extends downstream from the mechanical flow meter 92 and/or the manual flow control valve 96. The first supply conduit 104 may be connected to and/or carried by the chassis 14 via various brackets, U-bolts or the like. The first supply conduit 104 may include a single continuous conduit or multiple conduit sections fluidly coupled together. In one embodiment, as shown in FIG. 3, the first supply conduit 104 extends along the port side 20 of the chassis 14 from the aft portion 18 towards the forward portion 16. The first supply conduit 104 then extends upward generally parallel to the extension ladder 56 towards the platform 68.

As shown in FIG. 3 for example, a second supply conduit 106 extends downstream from the first supply conduit 104. In one embodiment, the second supply conduit 106 is desirably constructed from a flexible material such as rubber or a synthetic material. As shown in FIGS. 2 and 3, a fitting 112 is provided at a downstream end of the second supply conduit 106. As shown in FIGS. 1, 2 and 3, the upstream end of the second supply conduit 106 is fluidly connected or coupled to the downstream end of the first supply conduit 104 via a fluid coupling 108. In one embodiment, as shown in FIG. 2, the fluid coupling 108 swivels or rotates about an axis 110 to prevent a kink from forming at the connection between the first and the second supply conduits 104, 106 as the platform 68 is raised and lowered. In alternate embodiments, the fluid coupling 108 may be fixed at a predetermined angle with respect to the axis 110 so as to prevent kinking. In still other embodiments, the fluid coupling 108 may include a flex coupling such as a ball and socket.

As shown in FIGS. 2 and 3, the second supply conduit 106 extends vertically above and horizontally beyond the platform 68 and/or the guard rail 74. In particular embodiments, a generally arcuate conduit guide 114 provides a channel or path for routing the second supply conduit 106 over the guard rail 74. The conduit guide 114 also may secure the second supply conduit 106 to the guard rail 74 to prevent the second supply conduit from slipping away from the guard rail 74.

In particular embodiments, as shown in FIG. 2, the transloader 10 includes a first vapor conduit 116 and a second vapor conduit 118. The first vapor conduit 116 may be connected to and/or carried by the chassis 14 via various brackets, U-bolts or the like. The first vapor conduit 116 may include a single continuous conduit or multiple conduit sections fluidly coupled together. In one configuration, the first vapor conduit 116 extends along the starboard side 22 of the chassis 14 from the aft portion 18 towards the forward portion 16. The first vapor conduit 116 then extends upwardly generally parallel to the manually operated extension ladder 56.

The downstream end of the second vapor conduit 118 is fluidly coupled to the upstream end of the first vapor conduit 116 via a fluid coupling 120. In one embodiment, the second vapor conduit 118 is desirably constructed from a flexible material such as rubber or a synthetic material. In one embodiment, as shown in FIG. 2, the fluid coupling 120 swivels or rotates about an axis 122 to prevent a kink from forming at the connection between the first and the second vapor conduits 116, 118 as the platform 68 is raised and lowered. In alternate embodiments, the fluid coupling 120 may be fixed at a predetermined angle with respect to the axis 122 so as to prevent kinking. In other embodiments, the fluid coupling 120 may include a flex coupling such as a ball and socket. As shown in FIG. 2, a fitting 124 is provided at an upstream end of the second vapor conduit 118.

As shown in FIG. 2 for example, the second vapor conduit 118 extends vertically above and horizontally beyond the platform 68 and/or the guard rail 74. A generally arcuate conduit guide 126 provides a channel or path for routing the second vapor conduit 118 over the guard rail 74. The conduit guide 126 also may secure the second vapor conduit 118 to the guard rail 74.

Figure 6:
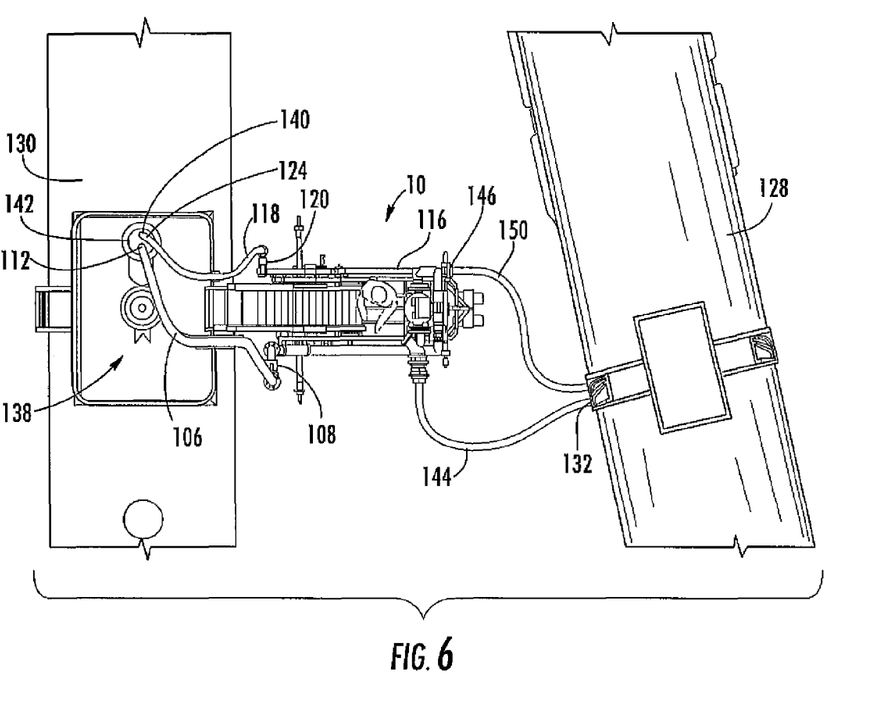
FIG. 6 provides a partial top view of the portable liquid transloader in operation as viewed along site-line 6-6 as shown in FIG. 5.

FIG. 5 provides a port side view of the transloader 10 in operation. FIG. 6 provides a top view of the transloader 10 in operation as viewed along site-line 6-6 as shown in FIG. 5. In one embodiment, as shown in FIGS. 5 and 6, the transloader 10 is used to transload a petroleum product, particularly crude oil between a supply tank 128 and a receiver tank 130. In particular embodiments, the supply tank 128 is carried by a tanker truck and the receiver tank 130 is carried by a rail car. As shown in FIG. 5, a fitting 132 and a pump 134 provide for fluid communication between the supply tank 128 and the transloader 10. The pump 134 may be connected to and/or carried by the supply tank 128 or may be an external device disposed downstream from the fitting 132. The pump 134 may be powered by an external power source such as an engine of a truck 136 or an external power source (not shown).

The transloader 10 may be maneuvered manually along the ground via the tow bar 44 into a proper position alongside the receiver tank 130. The bulk air eliminator 82, the inlet 84, the valve 88, the flow meter 92, the register 100, the printer 102 and various sections of the first supply conduit 104 and the first vapor conduit 116 are disposed toward the aft portion 18 of the chassis 14. In doing so, the bulk of the weight of the transloader 10 is carried by the aft portion of the chassis 14.

The vertically adjustable feet 30, 32, 48, 50 (FIGS. 1 and 2) may be manually adjusted via hand cranks 34, 36, 52, 54 (FIGS. 1 and 2) so as to stabilize and support the transloader 10. The fly section 60 (FIG. 5) may be raised or lowered to a desired height via the manually operated winch 64 (FIG. 2) such that the platform 68 and the guard rail 74 are positioned proximate to a top portion 138 (FIG. 5) of the receiver tank 130. As shown in FIG. 5, the fluid coupling 108 swivels to prevent a kink from developing between the first and second supply conduits 104, 106 as the extension ladder 56 is raised or lowered into position.

An operator may ascend the extension ladder 56 to access the platform 68. Because of the aforementioned distribution of the weight of the transloader 10 toward the aft portion 18 of the chassis 14, additional stability is afforded as the operator ascends the fly section 60 and walks onto the platform 68. The operator may then proceed through the opening 72 and onto the top portion 138 of the receiver car 130. The guard rail 74 provides a safety structure for the operator while working atop the receiver tank 130.

As shown in FIG. 6, the operator then may couple the fitting 124 of the second vapor conduit 118 to a vapor port 140 that is disposed along the top portion 138 of the receiver tank 130. As shown in FIGS. 5 and 6, the fitting 112 of the second supply conduit 106 may then be coupled to a supply port 142 that provides for fluid communication into the receiver tank 130.

As shown in FIG. 5, the operator then may fluidly connect the inlet 84 of the first supply conduit 104 to the fitting 132 of the supply tank 128 via one or more fluid conduits 144. In addition or in the alternative, as shown in FIGS. 5 and 6, the operator then may connect the downstream end or outlet 146 of the first vapor conduit 116 to a vapor exhaust system 148 (FIG. 5) such as a recovery tank and/or the supply tank 128 (FIG. 6) via one or more fluid conduits 150.

The pump 134 (FIG. 5) may be engaged to charge the fluid conduits 144 (FIG. 5) with the crude oil from the supply tank 128. The crude oil may then flow through the inlet 84 (FIG. 4), the manual shut off valve 88 (FIG. 4), through the fluid filter 90 (FIG. 4) and into the bulk air eliminator 82 (FIG. 4). The crude oil is routed across one or more baffles (not shown) disposed within the bulk air eliminator 82 which briefly stops the flow of the crude oil before forcing it to change its flow direction at least once before it clears the one or more baffles. As a result, air entrained within the crude oil will bubble out of the crude oil and an air-release mechanism (not shown) will release the air from the bulk air eliminator 82 as it accumulates. Removal of the entrained air is necessary to provide accurate readings from the mechanical flow meter 92.

The crude oil is then routed downstream from the bulk air eliminator 82 (FIG. 4) and through the mechanical flow meter 92 (FIG. 4). The mechanical preset counter 98 (FIG. 4) and/or the mechanical register 100 (FIG. 4) provide a display for the operator which indicates the volume of the crude oil passing through the mechanical flow meter 92 (FIG. 4). The mechanical flow control valve 96 (FIG. 4) may be used to manually start, stop, increase or decrease the flow of the crude oil. Once a desired volume of the crude oil has been transloaded between the supply tank 128 (FIG. 5) and the receiver tank 130 (FIG. 5), the operator may use the mechanical printer 102 (FIG. 4) to print a receipt (not shown) which indicates the volume of crude oil transloaded. The receipt may be used as a custody transfer approved bill of laden.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A portable liquid transloader, comprising:
a wheeled support vehicle having a chassis;
b. a manually operated extension ladder having a base section carried by said chassis and a fly section extendably connected to said base section;
c. a platform that extends horizontally outwardly from said fly section;
d. a bulk air eliminator carried by said chassis;
e. an inlet disposed upstream from said bulk air eliminator;
f. a mechanical flow meter disposed downstream from said bulk air eliminator;
g. a first supply conduit that extends downstream from said mechanical flow meter, wherein said first supply conduit is carried by said chassis and extends generally parallel to said extension ladder;
h. a second supply conduit fluidly coupled to said first supply conduit, wherein said second supply conduit extends vertically above and horizontally beyond said platform;
i. a first vapor conduit carried by said chassis;
j. a second vapor conduit fluidly coupled to said first vapor conduit; and
k. wherein said first vapor conduit extends generally parallel to said manually operated extension ladder and said second vapor conduit extends vertically above and horizontally beyond said platform.

2. The portable liquid transloader as in claim 1, wherein said second supply conduit is fluidly coupled to said first supply conduit via a fluid coupling that swivels about an axis to prevent kinking of said second supply conduit.

3. The portable liquid transloader as in claim 1, further comprising a manual shut off valve disposed downstream from said inlet and upstream from said bulk air eliminator.

4. The portable liquid transloader as in claim 1, further comprising a fluid filter disposed downstream from said inlet and upstream from said mechanical flow meter.

5. The portable liquid transloader as in claim 1, wherein said mechanical flow meter includes at least one of the components selected from the following: a mechanical pre-set counter, a mechanical register and a mechanical printer.

6. The portable liquid transloader as in claim 1, further comprising:
   a. a support member that extends upwardly from said platform; and
   b. a guard rail that extends laterally and horizontally outwardly from said support member.

7. The portable liquid transloader as in claim 6, further comprising an arcuate conduit guide connected to said guard rail.

8. The portable liquid transloader as in claim 1, wherein said second vapor conduit is fluidly coupled to said first vapor conduit via a fluid coupling that swivels about an axis to prevent kinking of said second vapor conduit.

9. A portable liquid transloader, comprising:
   a. a wheeled support vehicle having a chassis, said chassis having a forward portion and an aft portion disposed at an opposite end of said chassis from said forward portion;
   b. a manually operated extension ladder having a base section connected to said chassis proximate to said forward portion, the extension ladder including a fly section extendable from said base section;
   c. a platform that extends horizontally outward from said fly section;
   d. a bulk air eliminator carried by said chassis;
   e. an inlet disposed upstream from said bulk air eliminator;
   f. a mechanical flow meter disposed downstream from said bulk air eliminator;
   g. a first supply conduit that extends downstream from said mechanical flow meter, wherein said first supply conduit is carried by said chassis;
   h. a second supply conduit fluidly coupled to said first supply conduit, wherein said second fluid conduit extends beyond said platform;
   i. wherein said bulk air eliminator and said mechanical flow meter are carried by said chassis proximate to said aft portion;
   j. a first vapor conduit connected to said chassis; and
   k. second vapor conduit fluidly coupled to said first vapor conduit; and
   l. wherein said first vapor conduit extends generally parallel to said extension ladder and said second vapor conduit extends beyond said platform.

10. The portable liquid transloader as in claim 9, wherein said second supply conduit is fluidly coupled to said first supply conduit via a fluid coupling that swivels about an axis to prevent kinking of said second supply conduit.

11. The portable liquid transloader as in claim 9, further comprising a manual shut off valve disposed downstream from said inlet and upstream from said bulk air eliminator.

12. The portable liquid transloader as in claim 9, further comprising a fluid filter disposed downstream from said inlet and upstream from said mechanical flow meter.

13. The portable liquid transloader as in claim 9, wherein said mechanical flow meter includes at least one of the components selected from the following: a mechanical pre-set counter, a mechanical register and a mechanical printer.

14. The portable liquid transloader as in claim 9, further comprising:
   a. a support member that extends upwardly from said platform;
   b. a guard rail that extends laterally and horizontally outwardly from said support member; and
   c. a conduit guide connected to said guard rail.

15. The portable liquid transloader as in claim 9, wherein said second vapor conduit is fluidly coupled to said first vapor conduit via a fluid coupling that swivels about an axis to prevent kinking of said second vapor conduit.

16. A portable liquid transloader, comprising:
   a. a wheeled support vehicle having a chassis;
   b. a manually operated extension ladder having a base section carried by said chassis, said extension ladder including a fly section selectively extendable from said base section;
   c. a platform that extends horizontally outwardly from said fly section;
   d. a bulk air eliminator carried by said chassis;
   e. an inlet disposed upstream from said bulk air eliminator;
   f. a mechanical flow meter disposed downstream from said bulk air eliminator, wherein said mechanical flow meter comprises at least one of the components selected from the following: a mechanical pre-set counter, a mechanical register and a mechanical printer;
   g. a first supply conduit that extends downstream from said mechanical flow meter, wherein said first supply conduit is carried by said chassis and extends generally parallel to said extension ladder;
   h. a second supply conduit fluidly coupled to said first supply conduit, wherein said second supply conduit extends horizontally beyond said platform;
   i. wherein said first supply conduit is connected to said second supply conduit via a fluid coupling that swivels about an axis to prevent kinking of said second supply conduit; and
   j. a first vapor conduit carried by said chassis and a second vapor or conduit fluidly coupled to said first vapor conduit via a fluid coupling, wherein said first vapor conduit extends generally parallel to said extension ladder and said second vapor conduit extends horizontally beyond said platform.

17. The portable liquid transloader as in claim 16, wherein said second supply conduit and said second vapor conduit are each fluidly coupled respectively to said first supply conduit and said first vapor conduit via a respective fluid coupling that swivels about an axis to prevent kinking.

* * * * *